(12) United States Patent  
Flegel

(10) Patent No.: US 9,136,693 B1
(45) Date of Patent: Sep. 15, 2015

(54) GENERATOR WITH SELECTIVELY BONDED NEUTRAL CONNECTION

(71) Applicant: Reliance Controls Corporation, Racine, WI (US)

(72) Inventor: Michael O. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 132 days.

(21) Appl. No.: 13/777,276

(22) Filed: Feb. 26, 2013

(51) Int. Cl.
*H02H 3/00* (2006.01)
*H02H 3/16* (2006.01)
*H01R 13/713* (2006.01)
*H02H 3/08* (2006.01)
*H02H 3/33* (2006.01)
*H02H 1/00* (2006.01)

(52) U.S. Cl.
CPC .............. *H02H 3/16* (2013.01); *H01R 13/7135* (2013.01); *H02H 1/0015* (2013.01); *H02H 3/08* (2013.01); *H02H 3/338* (2013.01)

(58) Field of Classification Search
USPC ..................................................... 361/42–50
See application file for complete search history.

(56) References Cited

U.S. PATENT DOCUMENTS

| 4,110,808 | A | 8/1978 | Hobson et al. |
| 4,580,186 | A * | 4/1986 | Parker et al. ................... 361/42 |
| 5,751,524 | A | 5/1998 | Swindler |
| 7,446,437 | B2 | 11/2008 | Paik et al. |
| 7,521,822 | B2 | 4/2009 | Lorenz |
| 7,692,332 | B2 | 4/2010 | Nordman et al. |
| 7,932,635 | B2 | 4/2011 | Shenoy et al. |
| 7,986,500 | B2 * | 7/2011 | Lazarovich et al. ........... 361/42 |
| 7,995,316 | B2 | 8/2011 | Carpenter, Jr. et al. |
| 2005/0212526 | A1 * | 9/2005 | Blades ........................... 324/543 |
| 2006/0044710 | A1 * | 3/2006 | Beneditz et al. ............... 361/20 |
| 2008/0179945 | A1 * | 7/2008 | Linebach et al. ........ 303/122.01 |
| 2010/0010684 | A1 | 1/2010 | Lorenz et al. |
| 2012/0019965 | A1 * | 1/2012 | Faxvog et al. ................. 361/42 |

* cited by examiner

*Primary Examiner* — Danny Nguyen
(74) *Attorney, Agent, or Firm* — Boyle Fredrickson, S.C.

(57) ABSTRACT

A generator which is self-configurable to selectively bond the neutral lead to the ground lead of the generator. The generator includes a sensor configured to detect current flow on the ground lead of the generator. The sensor generates a signal corresponding to the current flow which is, in turn, provided to a controller present on the generator. A switch device, such as a relay selectively connects the neutral conductor to the ground conductor at the generator. The controller outputs a signal to control the switch device in response to the signal from the current sensor. If the controller detects current flowing on the ground lead, it opens the switch between the neutral and ground conductors; however, if the controller detects no current on the ground lead, it closes the switch between the neutral and ground conductors.

9 Claims, 2 Drawing Sheets

GENERATOR WITH SELECTIVELY BONDED NEUTRAL CONNECTION

BACKGROUND OF THE INVENTION

The present invention relates generally to generators and, more particularly, to a generator that detects ground currents and selectively bonds the neutral lead of the generator to the ground lead of the generator responsive to a detected ground current.

Electrical panels, breaker boxes, or load centers frequently include a main contactor, switch, or breaker, which electrically isolates a series of individual circuit or load breakers from a utility power input. In a typical utility power input installation, the main contactor selectively connects or disconnects a first hot lead, L1, and a second hot lead, L2, with a respective bus bar, to which the individual circuit or load breakers are connected. A neutral lead, N, is connected to a neutral bar from which neutral connections are distributed to each of the loads. In addition, a ground connection is established in the load center, for example, by a ground bar connected to a conductive rod inserted into the ground or to a metal wire or pipe exiting the site into the ground. The ground bar provides connection points for ground conductors to be distributed to the loads as required. According to wiring standards, the neutral lead, N, from the utility power is connected to the ground connection at a single location within the electrical distribution system. Thus, in a standard installation a bonding wire may be connected between the neutral bar and the ground bar in the load center.

Occasionally, such load centers are configured to receive a secondary input power source, such as from a generator, to provide electrical power to certain of the individual loads or circuits in the event of a utility power failure. During interruption of utility power, the generator supplies power to the load center, which the load center distributes to selected circuits of the building. Depending on factors such as the size of the generator, the number of electrical loads, and whether a load is considered critical (i.e., must remain on during a utility power outage), such as a furnace, sump pump, etc., the secondary power source may power all of the electrical loads or only a portion of the loads. Similar to the utility power input, the generator includes a first hot lead, L1, a second hot lead, L2, and a neutral lead, N. The generator may also include a ground connection, such as a receptacle grounding terminal. The generator may be configured either with a bond between the neutral lead, N, and the ground connection (i.e., a bonded-neutral generator) or without a bond between the neutral lead, N, and the ground connection (i.e., a floating-neutral generator).

In a non-separately derived system, the neutral lead, N, from the generator is solidly connected to the neutral connection from the utility supply, and the neutral lead, N, of the generator must neither be directly connected to an earth ground nor to the ground connection of the generator (i.e., a floating-neutral generator). As previously indicated, a connection between the neutral and ground leads should be established at a single location in the electrical distribution system. Because the neutral connection in the generator is floating, the connection between the neutral and ground leads is established in the service entrance panel. In the same manner as a distribution system having no generator, this connection may be established via a bonding wire connected between the neutral bar and the ground bar in the load center. The neutral lead from the generator is bonded with the neutral lead from the utility, for example, at the neutral bar. A transfer switch is provided to selectively connect the hot leads, L1 and L2, from either the utility or the generator to the electrical loads.

A generator that has its neutral lead, N, bonded to the ground connection of the generator (i.e., a bonded-neutral generator) must be installed as a separately derived system. The neutral conductor from the loads is switched between the neutral lead, N, of each of the power sources to maintain a single bonding point in the system. The neutral leads, N, of the utility power source and the secondary power source, such as the generator, are switched by the transfer switch in addition to the hot leads, L1 and L2. Further, the connection between neutral and ground for the utility system must occur prior to the switched connection such that it is removed when the secondary power source is connected and the equipment grounds for the loads are separated from the neutral. Typically the neutral bar and the ground bar are not connected directly in a service entrance panel but rather they are combined into one dual-function terminal bar. This separation is needed in a service entrance transfer panel to keep the neutrals and ground wires separate when switched to the secondary power source since the connection between neutral and ground takes place further upstream toward the power source and cannot occur again in the panel.

A potential problem arises when a bonded-neutral generator, having a neutral connection connected to the equipment ground at the generator, is connected to a service panel having a transfer switch that is only configured to switch the hot leads, L1 and L2. In such a configuration, multiple connection points can be established between the neutral leads and the ground leads, creating a second conduction path parallel to the neutral conduction path. As a result, a portion of the current that is supposed to be conducted via the neutral lead may be present on the ground lead, raising the potential for damage to the electrical loads connected to the system.

SUMMARY OF THE INVENTION

The present invention is directed to a generator which is self-configurable to selectively bond the neutral lead to the ground lead of the generator. The generator includes a sensor configured to detect current flow on the ground lead of the generator. The sensor generates a signal corresponding to the current flow which is, in turn, provided to a controller present on the generator. A switch device, such as a relay, is provided to selectively connect the neutral conductor to the ground conductor at the generator. The controller outputs a signal to control the switch device in response to the signal from the current sensor. If the controller detects current flowing on the ground lead, it opens the switch between the neutral and ground conductors. By monitoring the current on the ground lead, the generator can detect whether the neutral leads between the utility and the generator are being switched by the transfer switch and select whether to bond the neutral lead at the generator accordingly. The switch device may have a normally open default position, and the controller may close the switch device at periodic intervals when the generator is running to check for current on the ground lead. Optionally, the switch device may have a normally closed position, and the controller may open the switch if the level of current and/or voltage detected exceeds a predefined level. The controller may then hold the switch device open until the generator is stopped.

According to one embodiment of the invention, a generator for providing electrical energy to an electrical distribution system includes an electrical energy generation device configured to generate the electrical energy, and a plurality of electrical conductors configured to transmit the electrical energy. The plurality of electrical conductors includes at least one hot conductor, a neutral conductor, and a ground conductor. The generator also includes a bonding jumper connected between the neutral conductor and the ground conductor, a sensor configured to generate a signal corresponding to an amplitude of current present on the bonding jumper, a switch connected in series with the bonding jumper and configured to selectively establish an electrical connection between the neutral conductor and the ground conductor in a first mode and break the electrical connection between the neutral conductor and the ground conductor in a second mode, and a controller configured to receive the signal from the sensor and configured to generate a control signal transmitted to the switch as a function of the signal from the sensor. The control signal places the switch in either the first mode or the second mode. The switch may be an electro-mechanical switch, such as a relay, or a solid state switch. The controller may be a logic circuit, including discrete electronic components, or a microcontroller, including an input configured to receive the signal from the sensor, an output configured to transmit the control signal, and a plurality of instructions configured to generate the control signal as a function of the signal from the sensor.

According to another embodiment of the invention, a method of selectively bonding a neutral connection in a generator is disclosed. A sensor is provided in a generator, and the generator is configured to provide electrical energy to an electrical distribution system via an electrical energy generation device and a plurality of electrical conductors, including at least one hot conductor, a neutral conductor, and a ground conductor. A bonding jumper and a switch are connected in series between the neutral conductor and the ground conductor. The amplitude of current present on the bonding jumper is measured with the sensor, and an electrical connection is selectively established between the neutral conductor and the ground conductor with the switch as a function of the amplitude of current present on the bonding jumper. In a first mode, the electrical connection is established, and in a second mode, the electrical connection is broken.

According to another aspect of the invention, the step of selectively establishing an electrical connection between the neutral conductor and the ground conductor further includes the steps of receiving a feedback signal at a controller, the signal corresponding to the amplitude of current present on the bonding jumper, and generating a control signal transmitted to the switch as a function of the feedback signal. The control signal places the switch in either the first mode or the second mode.

According to still another embodiment of the invention, a generator includes means for generating electrical energy, means for providing electrical energy to an electrical distribution system, including at least a neutral conductor and a ground conductor, means for sensing current present on a bonding jumper selectively connected between the neutral conductor and the ground conductor; and means for selectively connecting the bonding jumper as a function of the current sensed on the bonding jumper.

Various other features, objects and advantages of the present invention will be made apparent from the following detailed description of the drawing figures.

BRIEF DESCRIPTION OF THE DRAWINGS

Various exemplary embodiments of the subject matter disclosed herein are illustrated in the accompanying drawings in which like reference numerals represent like parts throughout, and in which.

DETAILED DESCRIPTION

The various features and advantageous details of the subject matter disclosed herein are explained more fully with reference to the non-limiting embodiments described in detail in the following description.

Figure 1:
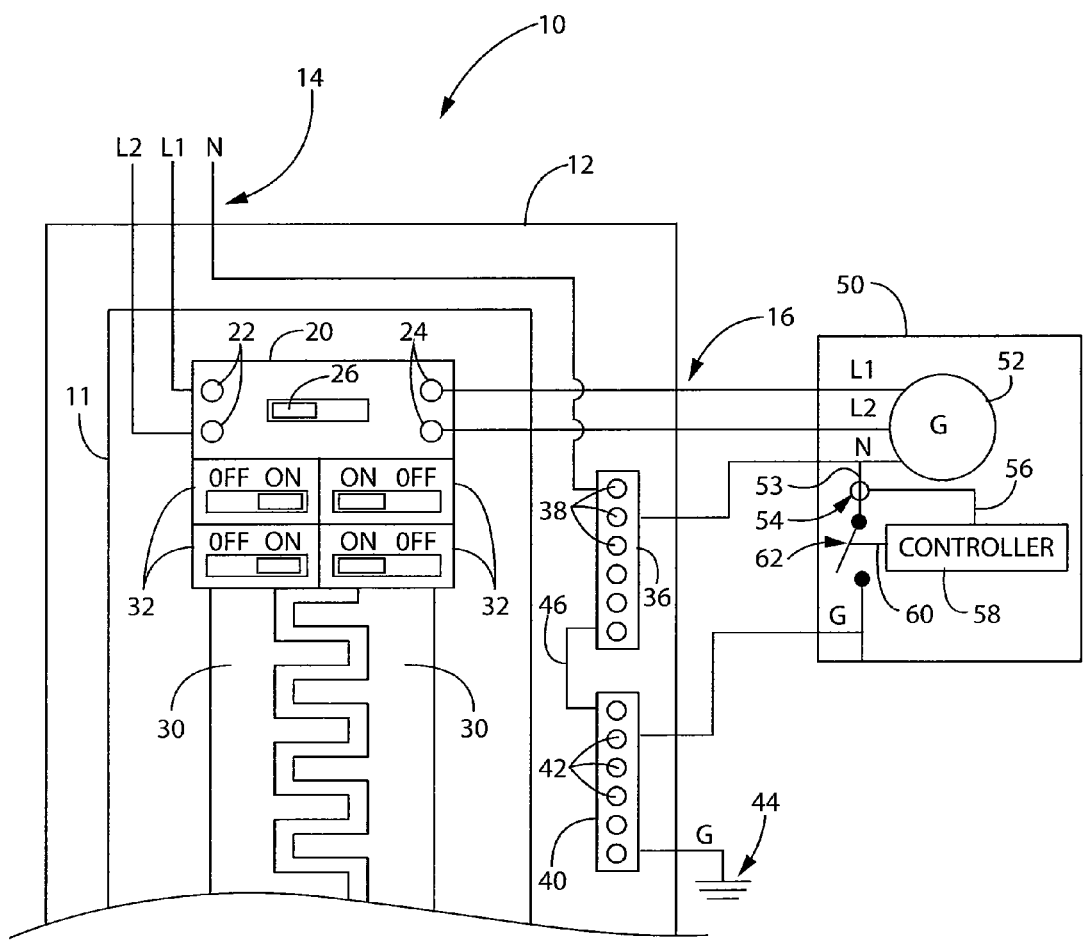
FIG. 1 is a block diagram representation of a generator according to one embodiment of the invention connected to a non-neutral switching transfer switch.

Referring first to FIG. 1, one embodiment of an electrical distribution system including a load center 10 having a transfer switch 20 configured to selectively provide electrical energy to a load from one of two power sources is disclosed. The load center 10 includes an enclosure 12 having an electrical panel 11 mounted within the enclosure 12. The transfer switch 20 is mounted to the electrical panel 11 and receives a first set of electrical conductors 14 from a first power source, such as the utility supply, at a first set of terminals 22. The transfer switch 20 receives a second set of electrical conductors 16 from a second power source, such as a backup generator 50, at a second set of terminals 24. The transfer switch 20 includes a switch arm 26 movable between a first position, which connects each of the hot leads, L1, L2 from the utility power source to one of a pair of terminal bars 30, and a second position, which connects each of the hot leads, L1, L2 from the generator 50 to one of the terminal bars 30. As illustrated, the switch arm 26 is manually transferred between the first and second positions. Optionally, a sensor may be included to monitor operation of the utility power source, and, if the utility power source fails, a solenoid or other actuator may be energized to automatically transfer the switch arm 26 between the first and second positions. Alternately, still other configurations of manual and or automatic transfer switches may be employed without deviating from the scope of the invention.

The load center 10 distributes the power from one of the two sources to an electrical load. Circuit breakers 32 are mounted to the terminal bars 30 such that a first terminal on the rear of each circuit breaker 32 establishes an electrical connection with the terminal bar 30 to which it is mounted. A second terminal on the side of each circuit breaker 32 is configured to receive a first electrical conductor providing power to the load. The neutral conductor, N, from the utility supply is connected to one of the terminals 38 on a neutral bar 36. Other terminals 38 of the neutral bar 36 are configured to receive a second electrical conductor providing power to the load. The first and second electrical conductors define a forward conduction path and a return conduction path, establishing a circuit, between from the load center 10 and the load. One or more of the circuits may also include a ground conductor. A ground bar 40 includes multiple terminals 42 to which each of the ground conductors may be connected. An earth ground 44, which may be, for example, a copper rod sunk into the ground next to the building in which the load center 10 is housed, is electrically connected to the ground bar 40. Because the illustrated transfer switch only switches the two hot leads, L1 and L2, of each power supply and does not switch neutral leads, N, a permanent bond between the neutral lead, N, and earth ground 44 is established. A bonding jumper 46 establishes this bond connecting the neutral bar 36 to the ground bar 40.

A generator 50 is connected to the load center 10 to provide a secondary energy source. The generator 50 includes an energy generation device 52, in a manner as is known. According to one embodiment of the invention, the energy generation device includes a combustion engine fueled by gasoline, diesel fuel, propane, or any other fuel. As the combustion engine operates, it spins a rotor within a stator of a generator. The rotor has permanent magnets mounted thereto which excite the windings of the stator, generating electricity. Optionally, various other configurations of an energy generation device 52 may be utilized without deviating from the scope of the invention. The windings on the stator are configured to provide at least one hot lead, L1, and a neutral lead, N. As illustrated, the windings of the energy generation device 52 provide a first hot lead, L1, and a second hot lead, L2, in addition to the neutral lead, N. A ground lead, G, may be connected, for example to the chassis of the generator 50. A bonding jumper 53 is provided internal to the generator 50 to connect the neutral lead, N, to the ground lead, G.

A sensor 54 measures the amplitude of current present on the bonding jumper 53 and generates a feedback signal 56 corresponding to the amplitude of current. The feedback signal 56 is input to a controller 58, and the controller 58 is configured to generate an output signal 60 as a function of the feedback signal 56. The output signal 60 is transmitted to a switch 62 connected in series with the bonding jumper 53, and the output signal 60 controls operation of the switch 62. According to one embodiment of the invention, the controller 58 includes discrete logic devices, including, for example, a buffer and/or voltage conditioner to convert the feedback signal from a first level to a second level, a voltage regulator to generate reference voltages either from the generated voltage or from a battery, a comparator to compare the feedback signal to the reference voltages, and an isolation circuit or output buffer to supply the output signal 60 to the switch 62. Optionally, the controller 58 may be a microcontroller including an input configured to receive the feedback signal and an output configured to supply the output signal 60 to the switch. The microcontroller may include integrated memory or may access external memory to retrieve a series of stored instructions. The microcontroller is configured to execute the instructions to generate the output signal 60 as a function of the feedback signal 56. It is contemplated that the controller 58 may include still other combinations of devices without deviating from the scope of the invention.

Figure 2:
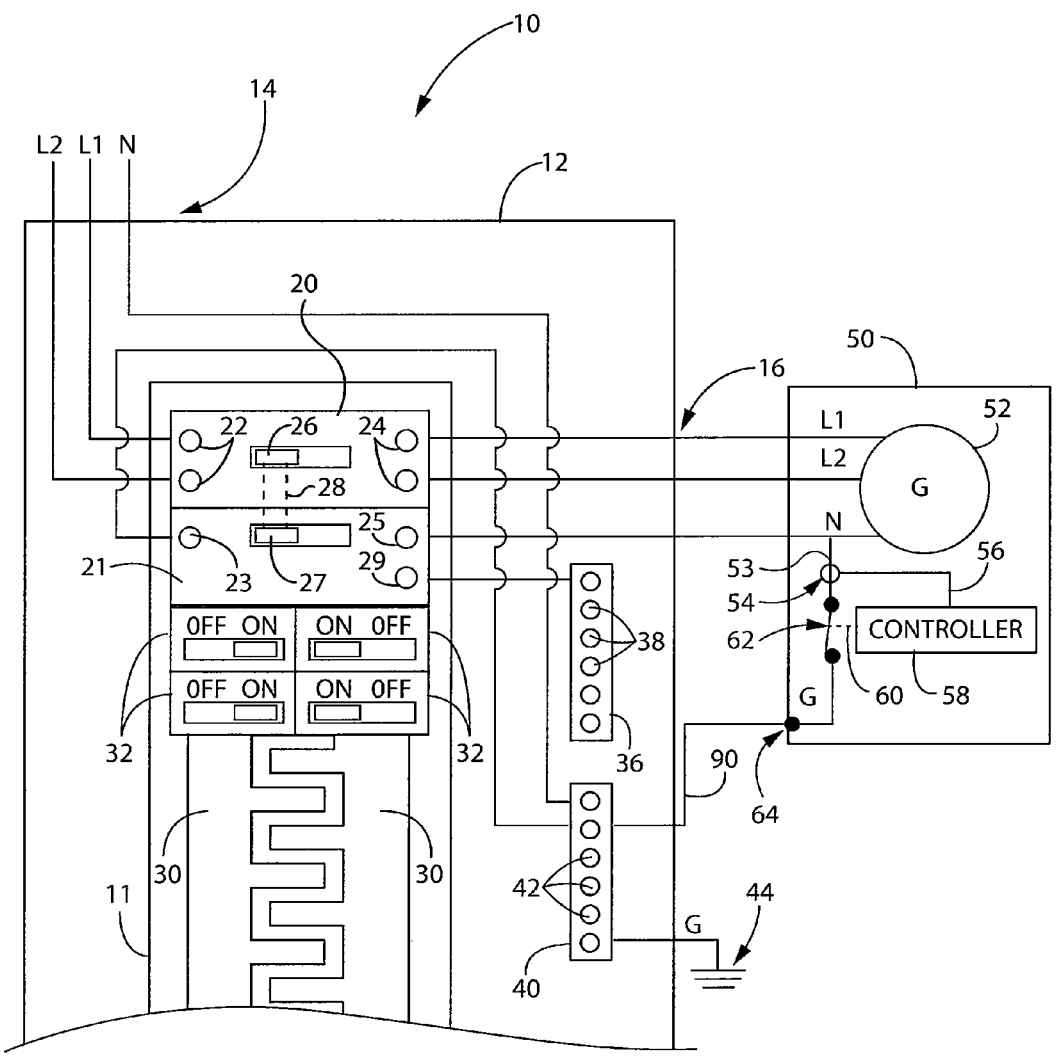
FIG. 2 is a block diagram representation of a generator according to one embodiment of the invention connected to a neutral switching transfer switch.

FIG. 2 illustrates another embodiment of an electrical distribution system including a load center 10 having a transfer switch 20 with a neutral switch 21 configured to selectively provide electrical energy to a load from one of two power sources. The load center 10 includes an enclosure 12 having an electrical panel 11 mounted within the enclosure 12. The transfer switch 20 and the neutral switch 21 are each mounted to the electrical panel 11 and together receive a first set of electrical conductors 14 from a first power source, such as the utility supply 14, at a first set of terminals 22, 23. The transfer switch 20 and the neutral switch 21 also receive a second set of electrical conductors 16 from a second power source, such as the backup generator 50, at a second set of terminals 24, 25. The transfer switch 20 includes a switch arm 26 movable between a first position, which connects each of the hot leads, L1, L2 from the utility power source to one of a pair of terminal bars 30, and a second position, which connects each of the hot leads, L1, L2 from the generator 50 to one of the terminal bars 30. The neutral switch 21 includes a switch arm 27 movable between a first position, which connects the neutral lead, N, from the utility power source to the neutral switch output 29, and a second position, which connects the neutral lead, N, from the generator 50 to neutral switch output 29. With the neutral switch 21, the neutral lead, N, from the utility power source is first connected to a first terminal 42 of the ground bar 40 and another conductor runs from a second terminal 42 of the ground bar 40 to the first terminal 23 of the neutral switch 21, establishing a ground connection with the utility neutral lead prior to switching the neutral connections.

As illustrated, each of the switch arms 26, 27 is manually transferred between the first and second position. A mechanical interlock device 28 is included such that both switch arms 26, 27 are moved in tandem. Optionally, the mechanical interlock may be configured to toggle the switch arms 26, 27 in a desired sequence. According to still another embodiment of the invention, a sensor may be included to monitor operation of the utility power source, and, if the utility power source fails, a solenoid or other actuator may be energized to automatically transfer each of the switch arms 26, 27 between the first and second positions. Alternately, still other configurations of manual and or automatic transfer switches may be employed without deviating from the scope of the invention.

The load center 10 distributes the power from one of the two sources to an electrical load. Circuit breakers 32 are mounted to the terminal bars 30 such that a first terminal on the rear of each circuit breaker 32 establishes an electrical connection with the terminal bar 30 to which it is mounted. A second terminal on the side of each circuit breaker 32 is configured to receive a first electrical conductor providing power to the load. The neutral switch output 29 is electrically connected to one of the terminals 38 on a neutral bar 36. Other terminals 38 of the neutral bar 36 are configured to receive a second electrical conductor providing power to the load. The first and second electrical conductors define a forward conduction path and a return conduction path, establishing a circuit, between the load center 10 and the load. One or more of the circuits may also include a ground conductor. A ground bar 40 includes multiple terminals 42 to which each of the ground conductors may be connected. An earth ground 44, which may be, for example, a copper rod sunk into the ground next to the building in which the load center 10 is housed, is electrically connected to the ground bar 40.

The generator 50 is connected to the load center 10 to provide a secondary energy source. The generator 50 includes an energy generation device 52 as discussed above with respect to FIG. 1. The windings of the energy generation device 52 provide a first hot lead, L1, a second hot lead, L2, and a neutral lead, N. The generator 50 also includes a ground connection 64. The generator 50 is normally connected to the earth ground 44 via a ground conductor 90 connected between the ground connection 64 and one of the terminals 42 on the ground bar 40. A bonding jumper 53, which may be internal to the generator 50, connects the neutral lead, N, to the ground conductor 90. A sensor 54 measures the amplitude of current present on the bonding jumper 53 and generates a feedback signal 56 corresponding to the amplitude of current. The feedback signal 56 is input to a controller 58, and the controller 58 is configured to generate an output signal 60 as a function of the feedback signal 56. The output signal 60 is transmitted to a switch 62 connected in series with the bonding jumper 53, and the output signal 60 controls operation of the switch 62. According to one embodiment of the invention, the controller 58 includes discrete logic devices. Optionally, the controller 58 may be a microcontroller. It is contemplated that the controller 58 may include still other combinations of devices without deviating from the scope of the invention.

In operation, the controller 58 in the generator 50 monitors the feedback signal 56 from the sensor 54 to control operation of the bonding switch 62. According to one embodiment of the invention, the switch 62 is normally closed, such that the bonding jumper 53 and switch 62 normally establish an electrical connection between the neutral lead, N, and the ground lead, G, in the generator 50. If the feedback signal 56 indicates the presence of current on the bonding jumper 53, the controller 58 generates the output signal 60 to open the bonding switch 62 thereby interrupting the conduction path between the neutral lead, N, and the ground lead, G. To avoid spurious trips, the feedback signal 56 may be filtered and/or a minimum threshold may be defined which the current on the bonding jumper 53 must exceed prior to opening the switch 62.

According to one embodiment of the invention, the controller 58 leaves the switch 62 open after detecting current on the bonding jumper 53. The switch 62 may be configured to be positively retained in either the first or second position. For example, the switch 62 may be a rocker or toggle-style switch with one or more actuators to move the switch 62 between the first and second positions. As the switch moves between positions, it overcomes a mechanical resistance point in the center position and "snaps" over to the other position. In this configuration, the generator 50 detects, for example, when a bonded generator is connected to a load center 10 having a transfer switch 20 configured to switch only the hot leads, L1, L2. If a bonded neutral generator is connected to a non-neutral switching transfer switch 20, a conduction path, parallel to the neutral conduction path, is established via the ground lead, G, from the generator and the bonding jumper 46 in the load center 10. This parallel conduction path results in undesirable current being conducted via the ground lead, G. By opening the switch 62 and leaving the switch 62 in the open state, this undesired conduction path is broken. The controller 58 may further be configured to reset the switch 62 to a closed state if, for example, a neutral switching transfer switch 20 is installed in the load center 10.

According to another embodiment of the invention, the controller 58 may allow the switch 62 to return to the normally closed position. The controller 58 may include, for example, a timer relay which opens for a period of time responsive to the control signal 60 from the controller 58 and automatically closes upon expiration of the timer. If the sensor 54 again detects current on the bonding jumper 53 after closing the switch 62, the controller 58 generates another control signal 60 to re-open the switch 62. This may continue at a periodic interval until the condition causing the current to flow on the ground lead, G, is resolved or, optionally, the controller 58 may include a counter which holds the switch 62 in an open state after the switch 62 is opened and closed a predefined number of times. The counter may be manually reset to allow the switch 62 to be closed again. Thus, the controller 58 in the generator 50 may differentiate between an intermittent fault condition and a continuous current being conducted on the ground lead, G, and determine whether to break the electrical connection between the neutral lead, N, and the ground lead, G, according to predetermined parameters.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

What is claimed is:

1. A generator for providing electrical energy to an electrical distribution system for a building, wherein the electrical distribution system includes a load center having a hot terminal bar, a neutral bar, and a ground bar, each bar configured to be connected to a plurality of circuits within the building, the generator comprising:
    an electrical energy generation device configured to generate the electrical energy;
    a first terminal configured to establish an electrical connection between a hot conductor from the electrical energy generation device and the hot terminal bar in the load center;
    a second terminal configured to establish an electrical connection between a neutral conductor from the electrical energy generation device and the neutral bar in the load center;
    a third terminal configured to establish an electrical connection between a ground conductor and the ground bar in the load center;
    a bonding jumper connected between the neutral conductor and the ground conductor;
    a sensor configured to generate a signal in response to current present on the bonding jumper;
    a switch connected in series with the bonding jumper, the switch configured to selectively establish an electrical connection between the neutral conductor and the ground conductor in a first mode and break the electrical connection between the neutral conductor and the ground conductor in a second mode; and
    a controller configured to receive the signal from the sensor and configured to generate a control signal transmitted to the switch as a function of the signal from the sensor, wherein the control signal places the switch in either the first mode or the second mode.

2. The generator of claim 1 wherein the switch is an electromechanical switch.

3. The generator of claim 1 wherein the switch is a solid state switch.

4. The generator of claim 1 wherein the controller is a logic circuit, including discrete electronic components.

5. The generator of claim 1 wherein the controller is a microcontroller including:
    an input configured to receive the signal from the sensor,
    an output configured to transmit the control signal, and
    a plurality of instructions configured to execute to generate the control signal as a function of the signal from the sensor.

6. A method of selectively bonding a neutral connection in a generator connected to an electrical distribution system for a building, wherein the electrical distribution system includes a load center having a hot terminal bar, a neutral bar, and a ground bar, each bar configured to be connected to a plurality of circuits within the building, the method comprising the steps of:
    providing a sensor in the generator, the generator including an electrical energy generation device to generate electrical energy, a first terminal configured to establish an electrical connection between a hot conductor from the electrical energy generation device and the hot terminal bar in the load center, a second terminal configured to establish an electrical connection between a neutral conductor from the electrical energy generation device and the neutral bar in the load center, and a third terminal configured to establish an electrical connection between the generator and the ground bar in the load center;

connecting a bonding jumper and a switch in series between the neutral conductor and the ground conductor;

detecting current present on the bonding jumper with the sensor; and selectively establishing an electrical connection between the neutral conductor and the ground conductor with the switch as a function of the current present on the bonding jumper, wherein in a first mode the electrical connection is established and in a second mode the electrical connection is broken.

7. The method of claim 6 wherein the step of selectively establishing an electrical connection between the neutral conductor and the ground conductor further comprises the steps of:

receiving a feedback signal at a controller, the feedback signal corresponding to an amplitude of current present on the bonding jumper; and generating a control signal transmitted to the switch as a function of the feedback signal, wherein the control signal places the switch in either the first mode or the second mode.

8. The method of claim 6 wherein the switch is an electromechanical switch.

9. The method of claim 6 wherein the switch is a solid state switch.

\* \* \* \* \*